Aug. 24, 1954
A. L. DILLON ET AL
2,686,989
FLOWER HOLDER
Filed July 13, 1949
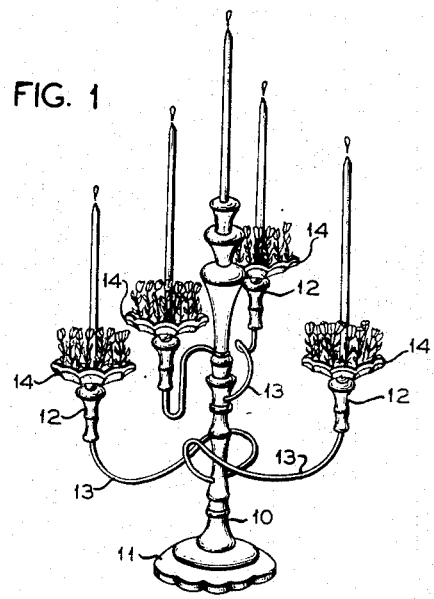
FIG. 1
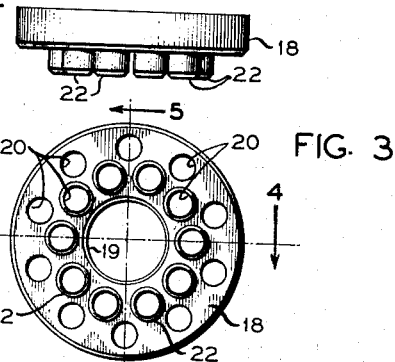
FIG. 2
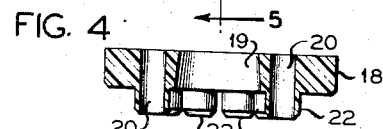
FIG. 3
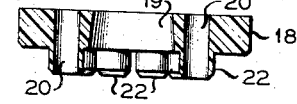
FIG. 4
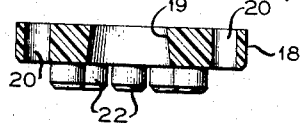
FIG. 5
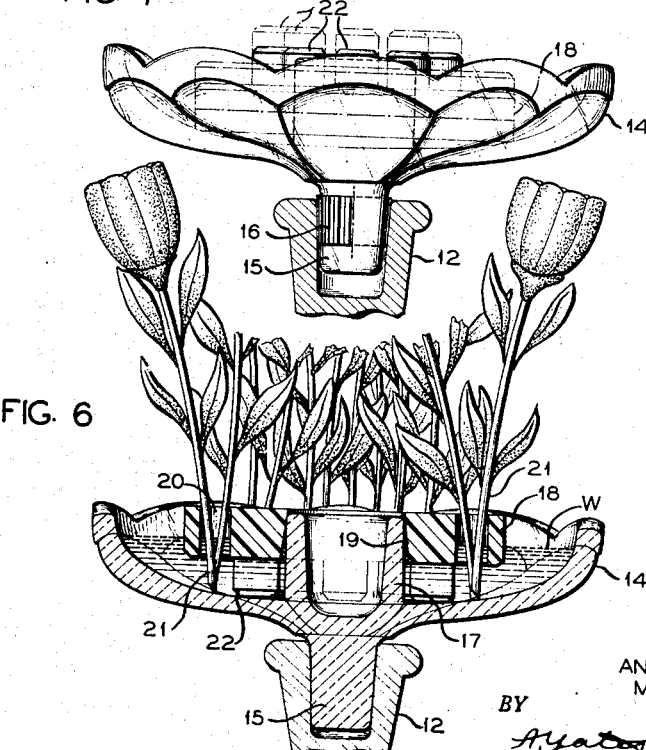
FIG. 6
FIG. 7
*INVENTORS*
ANNIE LEE DILLON
MARY G. DILLON
BY
*A. Yates Dowell*
ATTORNEY Patented Aug. 24, 1954

2,686,989

UNITED STATES PATENT OFFICE 2,686,989

FLOWER HOLDER

Annie Lee Dillon and Mary G. Dillon,
Raleigh, N. C.

Application July 13, 1949, Serial No. 104,468

4 Claims. (Cl. 47—41)

This invention relates to flower holders and more particularly to a floral holding device designed especially for use in connection with a structure for supporting a candle with flowers, and decorative articles about the same.

Since early times flowers have played a large part in the expression of the aesthetic and numerous artistic arrangements have been employed on various types of occasions. Much thought has been given to artistic decoration and numerous devices have been proposed for maintaining flowers and other plant life as well as decorative objects in a definite position in accordance with the dictates of the aesthetic tastes of the decorator.

Many of these devices have been unsatisfactory for various reasons, including the fact that they were cumbersome, unsightly, expensive, difficult to apply, and did not fit or blend into the arrangement, and frequently caused injury to the flowers and plants or did not hold them in proper position, as well as for other varied reasons.

It is an object of the invention to provide a simple, inexpensive flower holder of lightweight, flexible construction preferably in the form of annulus and therefore particularly adapted for use with candelabra and decorative article holders so that the flower holder may be adjusted relative to its weight and proximity to which it is mounted but which may be placed in an ordinary bowl for supporting flowers therein.

Another object of the invention is to provide a flower holder of a construction to hold flowers with the stems submerged in water for extending their lives and which holder will not easily deteriorate on account of its exposure to water.

Further objects and advantages of the invention will become apparent from the following description taken in conjunction with the accompanying drawings, wherein:

Fig. 1 is a perspective illustrating the invention as applied to a combination flower and decorative holder in conjunction with candelabra;

Fig. 2, a side elevation thereof;

Fig. 3, a bottom plan view;

Fig. 4, a section on the line 4—4 of Fig. 3;

Fig. 5, a section on the line 5—5 of Fig. 3;

Fig. 6, a section through a combination flower holder and decorative holder with the flower holder maintaining flowers with their stems in a bath of water; and Fig. 7, a side elevation of the structure of the preceding figure without the flowers, but with the flower holder inverted and with dotted lines illustrating a further position of the flower holder.

Briefly stated, the invention comprises a disk or annulus of relatively soft plastic including a central tapered aperture and spaced apertures about the same with short tubular portions having bores forming extensions of certain of said apertures on one side of the disk so that in effect a shoulder is provided between the same and the periphery of the disk.

With continued reference to the drawing, and particularly Fig. 1 thereof, the invention has been illustrated as applied to a candelabra 10, including a base 11, and provided with candle holders 12 on the extremities of arms 13.

Certain of the candle holders 12 have been supplied with combined candle and flower or article holding devices 14 of a decorative character which lend themselves well to use in connection with the instant invention. As disclosed more particularly in Figs. 6 and 7 of the drawing, each combined device 14 comprises a bowl-like body having a centrally located depending mounting projection 15 of an external diameter substantially corresponding to that of a candle so that the device may be readily supported in the candle-receiving socket of candelabra or candle holder.

In order to provide a particularly snug fit of the mounting projection within the candle-receiving socket, a thimble 16 or the like, preferably of a yieldable material may be employed to insure appropriate frictional engagement. Each device is further provided with a centrally located candle holding projection 17, there being a relatively wide space between said candle holding projection and the periphery of the bowl of the device.

In the application of the invention illustrated, the novel flower holding device has been disclosed as located within the device 14 and in surrounding relationship to the candle holding projection 17. It will be noted that the device, which may be made of crystal, precious metal, or other desired material, is highly ornamental per se and serves to materially enhance the beauty of the flower arrangement supported therein.

The novel flower holding device of the instant invention may be of any desired size, shape and material. The embodiment thereof which has been disclosed comprises an annulus 18 provided with a centrally located aperture 19 of a diameter substantially corresponding to the exterior diameter of the candle holding projection of the device illustrated. Preferably, this aperture is slightly tapered, or wider at the lower extremity thereof, for a purpose to be more fully described. Thus, the holder may be placed within the device around or in surrounding relationship to the candle holder, and accidental lateral displacement of the holder will be precluded. If desired, the holder may be molded of suitable plastic, such materials having inherent flexibility and lending themselves particularly satisfactorily to the present invention.

The holding device is further provided with a plurality of preferably concentrically spaced apertures 20 of comparatively small diameter and intended to receive the stems 21 of cut flowers or the like. These apertures may be of identical or varying diameters and a greater or lesser number thereof may be provided, with an increase in number of the apertures the possibilities for more compact floral arrangements will be materially increased. However, it is by no means requisite that flowers or the like be positioned within every aperture and, where desired, more than a single stem may be placed within a single aperture, it being apparent that the holder places no restrictions upon the artistic creations of the user but provides a structure having inherent flexibility of design which adapts itself to any motif.

Spaced tubular extensions 22 are provided having bores concentric with the innermost row of spaced apertures 20, and preferably formed integrally with the annulus. These extensions may be of any desired height, preferably less than the thickness of the annulus, in order to form a peripheral shoulder and are intended to rest upon the surface of the receptacle in which contained and support the annulus thereabove when the holding device is in the position illustrated in Fig. 6 of the drawing. Since each tubular extension 22 has an aperture 20 extending therethrough, the flowers which are placed in these apertures will remain in a more upright position than flowers placed within other and outermost apertures where the stems, projecting beneath the annulus, may be engaged and held in a more angular position.

The flower holding device of the present invention may be positioned within a receptacle as above described, resting upon the tubular extensions 22, or the holder may be reversed, with the tubular extensions projecting upwardly, as illustrated more particularly in Fig. 7 of the drawing, the device being constructed to function effectively in either position. When thus reversed, and positioned in surrounding relationship to the candle holding projection of the device illustrated, the flower holder will frictionally engage the candle holding projection, by reason of the reduced taper of the central aperture 19, and vertical adjustment of the flower holding device, upon said candle holding projection, as illustrated in dotted lines in this figure of the drawing, becomes possible. In either position the extremities of the stems of flowers or the like arranged in the holder will be beneath the water level indicated at W in Fig. 6 of the drawing, and the flowers will remain in the desired arrangement in exact portrayal of the artistic efforts of the decorator, for the life of the flowers employed.

It will be obvious to those skilled in this art that various changes may be made in this device without departing from the spirit and scope of the invention and therefore the invention is not limited by that which is shown in the drawing and described in the specification, but only as indicated in the appended claims.

What is claimed is:

1. A flower holder comprising an annulus of resilient material provided with a centrally located tapered support receiving opening and a plurality of spaced apertures of smaller diameter about said central opening for receiving and supporting the extremities of plant stems therein, and a plurality of spaced tubular extensions formed integrally with said annulus and in registry with certain of said spaced apertures, whereby plant life supported within the apertures extending through said extensions may be maintained in position at an angle to plant life supported within the apertures extending only through the annulus.

2. In combination with a combined article and candle holder having a relatively broad bowl-like body and a centrally located depending mounting projection of an external diameter substantially corresponding to that of a candle so as to fit within the candle-receiving socket of a candle holder, the said bowl-like body having an upright centrally located candle holding projection, of a flower holder comprising an annulus of resilient material provided with a centrally located tapered opening intended to receive said candle holding projection, the said annulus being provided with a plurality of spaced and concentrically disposed rows of apertures adapted to receive the extremities of stems of plant life, a plurality of spaced tubular extensions formed integrally with said annulus and each in registry with an aperture of the innermost row of said spaced apertures, the said annulus being vertically adjustable upon said candle holding projection.

3. A flower holder comprising an annular body of material having inherent flexibility with a central opening adapted to receive a candle holding projection and being adjustable along the same, said body having apertures extending therethrough in a direction generally parallel to said opening and spaced therefrom and hollow extensions having relatively thin walls projecting from said body in registry with certain of said apertures whereby stems of flowers may be supported at different angles.

4. A flower holder comprising an annular body of material having inherent flexibility and provided with a centrally located opening adapted to receive a candle holding projection, said body having a plurality of spaced apertures extending therethrough in a direction generally parallel to said centrally located opening, said apertures being located in at least two concentrically disposed rows, and a plurality of spaced tubular extensions on said annulus in registry with the apertures of the innermost of said concentrically disposed rows, whereby stems of flowers supported within the apertures extending through said tubular extensions may be maintained in position at an angle with respect to stems of flowers extending only through said annulus.

References Cited in the file of this patent

UNITED STATES PATENTS

| Number | Name | Date |
|---|---|---|
| D. 101,234 | McCartney | Sept. 15, 1936 |
| 387,280 | Bruce et al. | Aug. 7, 1888 |
| 485,417 | Lord | Nov. 1, 1892 |
| 928,213 | Patterson | July 13, 1909 |
| 1,857,140 | Carpenter | May 10, 1932 |
| 2,465,684 | Heintze | Mar. 29, 1949 |
| 2,531,562 | Eve | Nov. 28, 1950 |

FOREIGN PATENTS

| Number | Country | Date |
|---|---|---|
| 13,767 | Great Britain | July 4, 1905 |
| 21,034 | Great Britain | Sept. 21, 1907 |